United States Patent
Oshima et al.

(10) Patent No.: US 10,554,945 B2
(45) Date of Patent: Feb. 4, 2020

(54) STEREO CAMERA

(71) Applicant: Hitachi Automotive Systems, Ltd., Hitachinaka-shi, Ibaraki (JP)

(72) Inventors: Akira Oshima, Tokyo (JP); Haruki Matono, Tokyo (JP); Hiroto Mitoma, Hitachinaka (JP); Ryo Ota, Hitachinaka (JP); Shinya Ohtsuji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 164 days.

(21) Appl. No.: 14/410,619

(22) PCT Filed: Jun. 3, 2013

(86) PCT No.: PCT/JP2013/065309
§ 371 (c)(1),
(2) Date: Dec. 23, 2014

(87) PCT Pub. No.: WO2014/002692
PCT Pub. Date: Jan. 3, 2014

(65) Prior Publication Data
US 2015/0145963 A1 May 28, 2015

(30) Foreign Application Priority Data

Jun. 28, 2012 (JP) .................................. 2012-144906

(51) Int. Cl.
*H04N 13/106* (2018.01)
*H04N 13/243* (2018.01)
(Continued)

(52) U.S. Cl.
CPC .......... *H04N 13/106* (2018.05); *G06T 5/005* (2013.01); *G06T 5/40* (2013.01); *H04N 13/243* (2018.05);
(Continued)

(58) Field of Classification Search
CPC ............. G06T 2207/30252; G06T 5/40; G06T 7/0075; H04N 13/007; H04N 13/0239;
(Continued)

(56) References Cited

U.S. PATENT DOCUMENTS 5,619,301 A * 4/1997 Suzuki ..................... G02B 7/34
396/114
6,025,790 A * 2/2000 Saneyoshi ............ G05D 1/0251
244/17.11
(Continued)

FOREIGN PATENT DOCUMENTS

JP 4-301513 A 10/1992
JP 6-250078 A 9/1994
(Continued)

OTHER PUBLICATIONS

English Translation of JP 2008-045974, Feb. 2008, Japan, Morimitsu.*
(Continued)

*Primary Examiner* — Jamie J Atala
*Assistant Examiner* — Kathleen V Nguyen
(74) *Attorney, Agent, or Firm* — Crowell & Moring LLP (57) ABSTRACT

In order to provide a small, stereo camera with stable errors of distance measurement, there are provided: an image acquisition unit that acquires plural images imaged by plural imaging units; a first region processing unit that divides each of the plural images acquired by the image acquisition unit into first regions composed of predetermined plural pixels, and measures a distance for each of the divided first regions to generate a first distance image; a target object extraction unit that extracts a target object from the distance image or the image, and extracts a second region composed of the plural first regions including the extracted target object; an error factor identification unit that extracts a predetermined representative value from the inside of the second region, (Continued)

compares the brightness value of an arbitrary pixel in the second region with that in a correspondence region up to the position moved from the arbitrary pixel by a disparity represented by the representative value, and determines an error factor on the basis of the comparison result; and a second region processing unit that determines a weight value on the basis of the error factor, and measures a distance for each second region using the weight value to generate a second distance image.

10 Claims, 5 Drawing Sheets

(51) Int. Cl.
    *G06T 5/00*     (2006.01)
    *G06T 5/40*     (2006.01)

(52) U.S. Cl.
    CPC ............... *G06T 2207/10012* (2013.01); *G06T 2207/20172* (2013.01)

(58) Field of Classification Search
    CPC ............. H04N 13/242; H04N 13/0081; H04N 13/0092
    USPC ..................................... 348/87, 47
    See application file for complete search history.

(56) References Cited

U.S. PATENT DOCUMENTS

| | | | | |
|---|---|---|---|---|
| 2001/0028729 A1* | 10/2001 | Nishigaki | .......... | G06K 9/00201 382/104 |
| 2002/0031248 A1* | 3/2002 | Maed | .................. | G01R 31/311 382/149 |
| 2004/0081355 A1* | 4/2004 | Takahashi | ............ | G06K 9/0063 382/165 |
| 2008/0219505 A1* | 9/2008 | Morimitsu | ......... | G06K 9/00201 382/103 |
| 2009/0244313 A1* | 10/2009 | Masuda | ............. | H04N 5/23219 348/222.1 |
| 2011/0025860 A1* | 2/2011 | Katougi | ................ | G06T 3/4069 348/207.2 |
| 2011/0301925 A1* | 12/2011 | McWilliams, III | ...... | G09B 9/08 703/6 |
| 2012/0163704 A1* | 6/2012 | Chang | ................... | G06T 7/0022 382/154 |

FOREIGN PATENT DOCUMENTS

| | | | |
|---|---|---|---|
| JP | 11-177964 A | | 7/1999 |
| JP | 2001-273494 A | | 10/2001 |
| JP | 2008-045974 | * | 2/2008 |
| JP | 2008-45974 A | | 2/2008 |
| JP | 2011-128756 A | | 6/2011 |

OTHER PUBLICATIONS

International Search Report (PCT/ISA/210) dated Jul. 16, 2013, with English translation (Five (5) pages).

* cited by examiner

(a) USING DISTANCE IMAGE DATA (b) USING COLOR DATA OF IMAGE

STEREO CAMERA

TECHNICAL FIELD

The present invention relates to a stereo camera that measures a distance up to an object on the basis of images imaged by using two or more imaging elements.

BACKGROUND ART

Patent Literature 1 is one of background arts in the technical field. An object of Patent Literature 1 is to accurately detect plural types of objects. Therefore, disclosed is a stereo camera that divides an image into small regions, makes the small regions correspond with each other between plural images on the basis of the similarity of the brightness value to generate distance image data obtained by measuring distances, detects an object as one measurement target by grouping the small regions with the measured distances closer to each other, and measures the distance up to the object as the average value of the distances in the group.

Further, an object of Patent Literature 2 is to measure a distance up to an object by accurately detecting the object to be measured, as similar to Patent Literature 1. Thus, in addition to the grouping using the distance image data, small regions in which the brightness values of adjacent pixels are closer to each other in one image are grouped. Accordingly, disclosed is a stereo camera that can reliably detect an object as one measurement target to measure the distance up to the object as the average value of the distances in the group on the assumption that adjacent brightness values are not largely changed in the same object even in the case where the small regions cannot be grouped due to irregularities of the measured distances caused by the influence of the sizes of the small regions and division positions in spite of the same object.

CITATION LIST

Patent Literature

Patent Literature 1: Japanese Unexamined Patent Application Publication No. 2008-45974
Patent Literature 2: Unexamined Patent Application Publication No. 2011-128756

SUMMARY OF INVENTION

Technical Problem

A stereo camera that measures the distance and velocity of an object is applied to automobiles, construction machines, robots, and the like, and the distance and velocity up to an object in the vicinity are accurately measured, so that the stereo camera is used for realizing a drive assist system such as collision avoidance and recognition of self-location.

In the principle of distance measurement by the stereo camera that measures a distance up to an object on the basis of images imaged by using two or more cameras, the object images are allowed to match each other for correspondence using the images of the object for measurement imaged by the plural cameras, and the distance is computed by the principle of triangulation on the basis of the relation between the imaged position and the camera-mounted position. Therefore, shifting of the correspondence position results in an error of distance measurement.

There are three main error factors of distance measurement. The first factor is caused by imaging another object entering before an object to be measured. Specifically, water droplets and stains adhere to a camera lens or a clear panel provided on the front side of the camera, or raindrops enter, bugs fly, or leaves fall between the camera and an object to be measured. In the case where the stereo camera is used in harsh environments, it is necessary to respond to the error factor. If another object is imaged, an error largely occurs in the correspondence position. In order to minimize the error of distance measurement, an object of the present invention is to make images correspond with each other by removing pixels in which an object that is not a measurement target is imaged.

The second factor is caused by the size of an image region at the time of correspondence. If the size of the image region is small, the correspondence position is shifted by the influence of noise of an imaging element, or the correspondence position is shifted due to wrong correspondence with a region in the vicinity where patterns are similar. Therefore, in order to minimize the error of distance measurement, an object of the present invention is to makes correspondence by matching images of the entire object using a large region mostly occupied by the target object for measurement.

The third factor is caused by imaging a background around an object to be measured. The background corresponds to an object located far from the object to be measured, and thus an error occurs when the background is included in the correspondence region. Therefore, in order to minimize the error of distance measurement, an object of the present invention is to make images correspond with each other by removing pixels in which an object that is not a measurement target is imaged, as similar to the first factor.

Accordingly, in order to realize a small stereo camera with stable errors of distance measurement, a region in which an object that is not a measurement target is imaged needs to be removed on a pixel basis. In addition, it is necessary to make images correspond with each other using a large region containing the entire target object for measurement.

On the contrary, an object of the system of Patent Literature 1 is to detect an object unlike the aim of the present invention the object of which is to perform distance measurement with a small error. Therefore, the distance is measured on a small region basis, and an object that is not a measurement target is removed on a small region basis. Thus, the error of distance measurement may become large in some cases. Further, a histogram is generated by dividing with arbitrary segments such as separation in the vertical direction. Thus, many different objects are contained in the histogram other than the object to be measured. Further, when raindrops and stains that are the first error factors are contained, the representative value cannot be stably extracted in some cases. Thus, the problem of the present invention cannot be solved.

In addition, an object of the system of Patent Literature 2 is to detect an object unlike the aim of the present invention the object of which is to perform distance measurement with a small error. There is a small region that is properly determined as the same object as compared to Patent Literature 1. However, the system of Patent Literature 2 has the similar nature as that of Patent Literature 1. Thus, the problem of the present invention cannot be solved.

Accordingly, the present invention solves the above-described problems, and an object thereof is to provide a small stereo camera with stable errors of distance measurement.

Solution to Problem

In order to solve the problem, a stereo camera of the present invention is configured to include: an image acquisition unit that acquires plural images imaged by plural imaging units; a first region processing unit that divides each of the plural images acquired by the image acquisition unit into first regions composed of predetermined plural pixels, and measures a distance for each of the divided first regions to generate a first distance image; a target object extraction unit that extracts a target object from the distance image or the image, and extracts a second region composed of the plural first regions including the extracted target object; an error factor identification unit that extracts a predetermined representative value from the inside of the second region, compares the brightness value of an arbitrary pixel in the second region with that in a correspondence region up to the position moved from the arbitrary pixel by a disparity represented by the representative value, and determines an error factor on the basis of the comparison result; and a second region processing unit that determines a weight value on the basis of the error factor, and measures a distance for each second region using the weight value to generate a second distance image.

Advantageous Effects of Invention

According to the present invention, it is possible to provide a small stereo camera with stable errors of distance measurement.

DESCRIPTION OF EMBODIMENTS

Hereinafter, as an example of a preferred embodiment, a stereo camera according to the present invention that solves the problem will be described on the basis of the drawings.

First Embodiment

In the embodiment, in order to stably minimize errors of distance measurement even when an image contains raindrops and stains 214 and the like, an example of a stereo camera capable of realizing a process of extracting a target object as one large region and a process of removing error factors on a pixel basis will be described.

Figure 1:
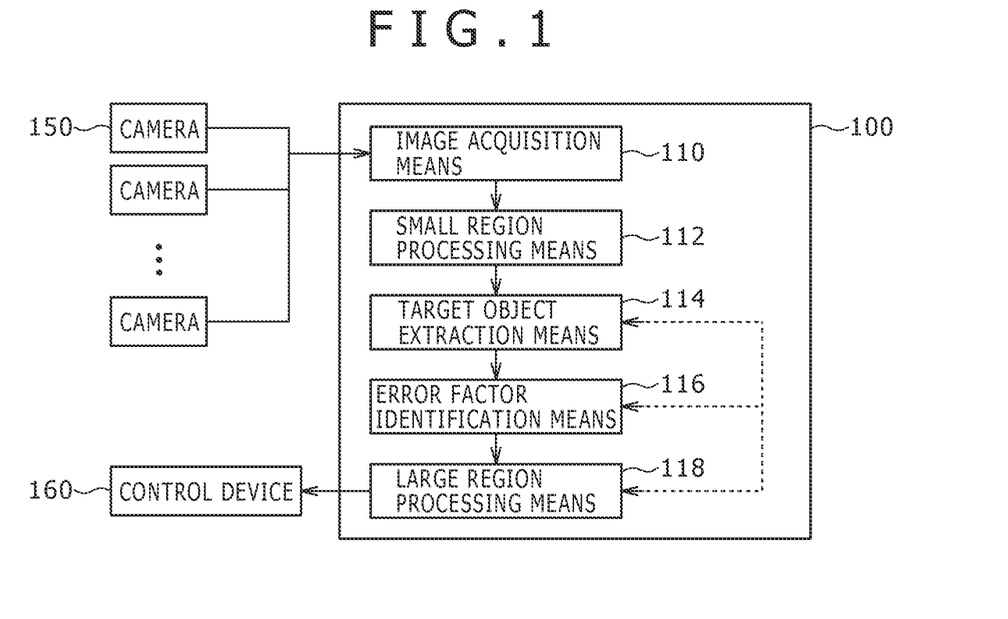
FIG. 1 is a diagram for showing an embodiment of a system configuration of a stereo camera according to the present invention.

FIG. 1 shows an example of a system configuration diagram of the stereo camera according to the embodiment, and the details thereof will be described below using reference numerals. A stereo camera processing device 100 includes image acquisition means 110, small region processing means 112, target object extraction means 114, error factor identification means 116, and large region processing means 118.

Further, images imaged by cameras 150 that are two or more imaging units are input to the stereo camera processing device 100, and processing results are output to a control device 160 that uses distance information of an object measured by the stereo camera. It should be noted that although not shown in the drawing, each means is realized using computing devices such as various computers (Central Processing Unit, Micro-Processing Unit, Digital Signal Processor, Application Specific Integrated Circuit, Field-Programmable Gate Array, and the like) and a memory mounted in the stereo camera processing device 100. The present invention can be carried out while the image information from two or more cameras 150 is not limited to any type of, for example, color information, monochrome information or infrared information.

The control device 160 is suitable for, for example, a motion controller for an automobile, a construction machine, or a mobile robot or an inspection device in dusty or liquid scattering environment. In addition, if the present invention is applied to a control device in which stains, raindrops, or liquid is generated on a camera lens or a clear panel on the front side of a camera, errors of the measured distance can be minimized and stability and reliability can be improved.

Further, although not shown in the drawing, in the process in the stereo camera processing device 100, a process of correcting lens distortion or a parallelizing process for images obtained from the image acquisition means 110 may be performed as preprocessing, and a filtering process for stabilization and high accuracy may be performed for the distance, velocity, or acceleration (each of which is a relative value or an absolute value) measured as processing results output to the control device 160 and results of recognition, sense, detection of the target object as post-processing.

Hereinafter, the small region processing means 112, the target object extraction means 114, the error factor identification means 116, and the large region processing means 118 configuring the stereo camera processing device 100 will be described in detail using FIG. 2 to FIG. 6.

Figure 2:
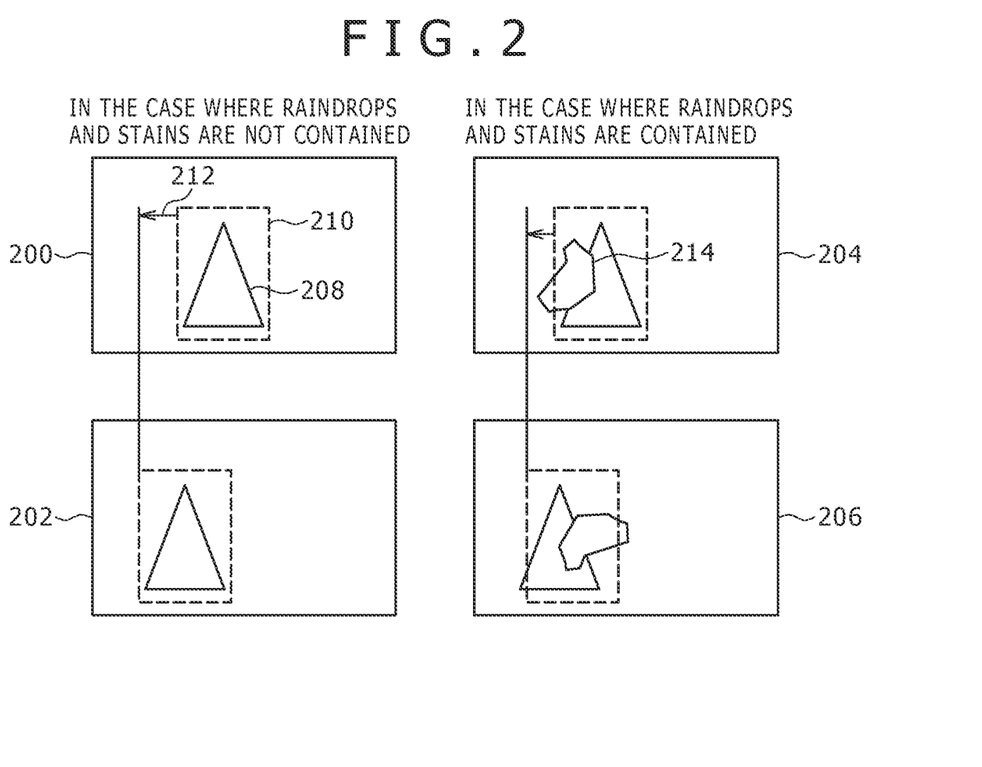
FIG. 2 is a diagram for showing image examples acquired by image acquisition means of the present invention.

FIG. 2 shows image examples obtained by the image acquisition means 110 configuring the stereo camera processing device 100, and the examples will be described using reference numerals.

The image acquisition means 110 obtains plural images imaged by the cameras 150 that are plural imaging units.

Among left image examples 200 and 204 and right image examples 202 and 206 to be obtained, a pair of the image example 200 and the image example 202 contains no raindrops and stains. If a large region can be properly extracted for a target object 208 for measurement contained in the image example 200 as an image region 210 used for correspondence, a correspondence position (disparity between images) 212 with a small error can be obtained in the image example 202.

As a concrete correspondence method, any one of general correspondence methods (Sum of Abusolute Difference, Sum of Suquared Difference, Normalized Cross-Correspondence, Phase-Only Correspondence, Lucas-Kanade, and the like) in an image process may be used.

On the contrary, in the case where the raindrops and stains (that are not measurement target objects) 214 are contained as in a pair of the left image example 204 and the right image example 206, if the above-described general method of the image process is applied as it is, the correspondence position 212 is shifted as shown in the drawing. Thus, errors occur in the measured distance and velocity. In this case, the present invention is advantageous because the errors of the measured distance can be minimized.

Figure 3:
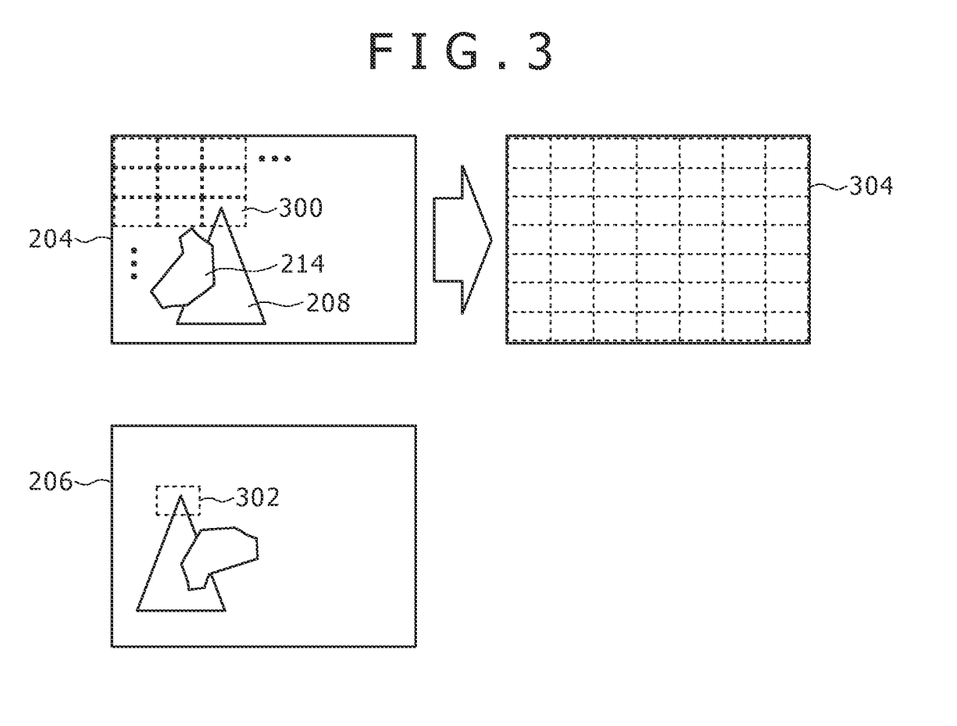
FIG. 3 is a diagram for showing a processing conceptual example in small region processing means of the present invention.

FIG. 3 is a processing conceptual diagram of the small region processing means 112 configuring the stereo camera processing device 100, and the diagram will be described using reference numerals.

The small region processing means 112 that is a first region processing unit divides each of plural images obtained by the image acquisition means 110 into small regions 300 that are first regions composed of predetermined plural pixels, and measures the distance of each divided first region to generate a distance image 304 that is a first distance image.

Specifically, the small region processing means 112 divides the left image example 204 into small regions having a predetermined fixed size. It should be noted that the definition of the small region will be described later.

Using the correspondence method, a small region that is a correspondence position in the image example 206 corresponding with each small region of the image example 204 is obtained.

As an example, the small region as the correspondence position in the right image example 206 corresponding with an arbitrary small region 300 in the left image example 204 is a small region 302. The distance image 304 (first distance image) can be obtained as a set of measured distances for the small regions. Although not shown in the drawing, the distance image 304 has the result of distance measurement for each small region, and includes various results such as small and large measurement errors.

The size of each small region needs to be empirically determined on the basis of the number of pixels and the angle of view of the camera. If the region is too small, noise by caused by the imaging element affects and wrong correspondence with a similar region in the vicinity disadvantageously occurs. If the region is too large, plural objects other than the target object for measurement are likely to be contained. Thus, the number of measurement results with small errors is disadvantageously reduced. In consideration of these problems, each small region is composed of plural pixels. Specifically, each small region is set as (a few pixels)×(a few pixels) to (tens of pixels)×(tens of pixels). Further, the fixed size of the small region has been described above. However, the size may vary depending on situations such as the degree of noise, or the most appropriate size may be selected on the basis of the tendency of distances measured by testing plural sizes.

Figure 4:
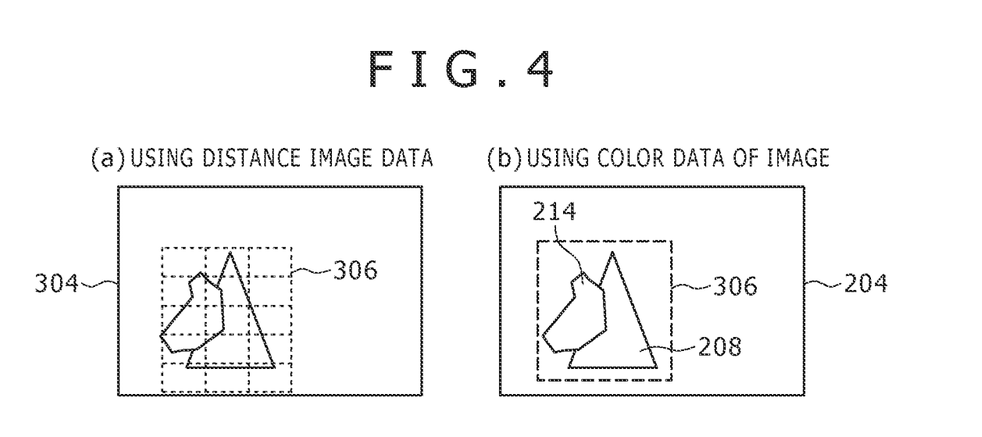
FIGS. 4A and 4B are diagrams each showing a processing conceptual example in target object extraction means of the present invention.

FIG. 4 are processing conceptual diagrams of the target object extraction means 114 configuring the stereo camera processing device 100 that is a processing unit, and the diagrams will be described using reference numerals.

The target object extraction means 114 extracts the target object 208 from the distance image 304 obtained by the small region processing means 112 that is the first region processing unit or from one image, and extracts a large region 306 that is a second region composed of plural first regions (small regions 300) containing the extracted target object 208.

Specifically, the target object extraction means 114 extracts the large region 306 composed of plural small regions containing the target object for measurement as one block. As shown in FIG. 4(a), one solid object may be extracted by grouping the distance image 304 generated by the small region processing means 112. As shown in FIG. 4(b), one solid object may be extracted by grouping on the basis of the similarity of colors (monochrome, color, infrared rays, or the like) of images between adjacent pixels from the image example 204. In the case where the image pattern of the target object for measurement is fixed, a method of recognizing, sensing, and detecting may be used using a general amount of characteristics and a discriminator in an image process. In order to minimize the errors of measurement of distances, any case of extracting as the large region containing the target object using any one of the methods can be applied to the present invention.

Figure 5:
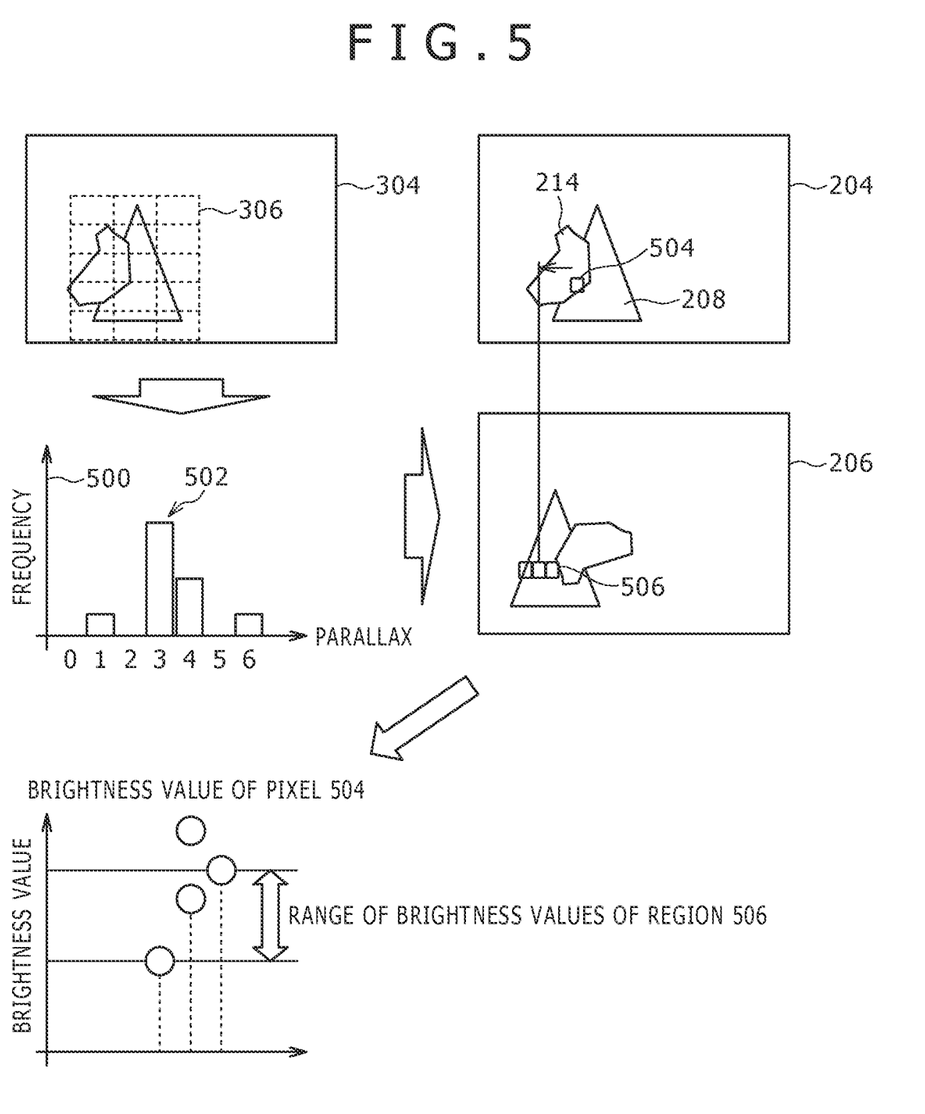
FIG. 5 is a diagram for showing a processing conceptual example in error factor identification means of the present invention.

FIG. 5 is a processing conceptual diagram of the error factor identification means 116 configuring the stereo camera processing device 100, and the diagram will be described below using reference numerals. It should be noted that processing steps are configured in the order of arrows.

The error factor identification means 116 extracts a predetermined representative value 502 from the inside of the second region (large region 306) extracted by the target object extraction means 114, and compares the brightness value of an arbitrary pixel 504 in the second region with that in a correspondence region 506 up to the position moved from the arbitrary pixel 504 by the disparity represented by the representative value 502. On the basis of the comparison result, the error factor is determined. Specifically, if the difference between the brightness values is a predetermined threshold value or larger, it is determined as an error factor. If the difference is smaller than the threshold value, it is not determined as an error factor. As an example, after extracting the representative value 502, it is determined whether or not the peak value of a frequency histogram 500 is a predetermined threshold value or larger, or the ratio or difference between the peak value and the second or following peak value is the threshold value or larger.

Specifically, the error factor identification means 116 creates the frequency histogram 500 for the measured values of the distance image 304 that is the first distance image inside the large region 306 that is the second region containing the target object 208 extracted by the target object extraction means 114. The horizontal axis of the frequency histogram 500 desirably represents a disparity as a unit, but may be a distance. The peak value is extracted from the frequency histogram 500 as the representative value 502. The representative value 502 indicates a disparity (or distance) up to the target object for measurement. The peak of the frequency histogram is extracted, so that the raindrops and stains 214 hardly affect. In addition, the distance image 304 used for generating the frequency histogram is limited to the inside of the large region 306, so that the peak indicating the target object for measurement can be stably extracted even in the case where the raindrops and stains 214 are contained due to the high frequency of the target object for measurement in the entire information. However, the distance up to the target object for measurement obtained using the representative value 502 corresponds to that obtained for each small region 300, and thus the error is large. Accordingly, the problem of the present invention cannot be solved in this stage. Further, in order to confirm that the peak can be stably obtained, the second largest peak value existing in a range apart from the representative value 502 by a certain value or larger on the horizontal axis of the frequency histogram is extracted. On the basis of the ratio or difference between the two peaks, in the case where the ratio or difference between the two peaks is a predetermined threshold value or larger, namely, in the case where the next peak value exceeds the threshold value set by the largest peak (the representative value 502 (largest peak) is extremely high as compared to the others), the stability is determined so as to be stable, and whether or not other objects that are difficult to remove are contained in the extracted large region may be determined. Further, in the vote of the value of the distance image 304 when generating the frequency histogram 500, the Gaussian Filter may be overlapped, so that the representative value 502 can be stably obtained.

Next, the following process is performed for each pixel inside the large region 306 containing the target object.

The arbitrary pixel 504 in the large region 306 existing in the left image example 204 is not located at the same position in the right image example 206, but is located around the position moved by the disparity represented by the representative value 502.

Accordingly, it is conceivable that the arbitrary pixel 504 of the left image example 204 corresponds with the correspondence region 506 in consideration of an error range included in the representative value 502 from the position moved by the representative value 502 on the right image example 206 obtained by another camera. If both of the arbitrary pixel 504 and the correspondence region 506 are not affected by the raindrops and stains 214, the brightness value of the arbitrary pixel 504 matches the range of the brightness value of the correspondence region 506 (the former is included inside the latter). On the contrary, if either the arbitrary pixel 504 or the correspondence region 506 is affected by the raindrops and stains 214, contradiction occurs so that the brightness values do not match each other (the former is included outside the latter) as shown in FIG. 5.

The unmatched pixel results in an error when the correspondence position is computed among plural images in the entire large region 306 containing the target object, and thus may be removed in accordance with the degree of matching. It should be noted that if the error generated in the representative value 502 is an integer, the correspondence region 506 is composed of integer pixels. If the error includes a decimal number, the intermediate brightness value may be generated or the decimal number may be rounded up to an integer on the basis of the concept of the linear interpolation. Further, even in the case where plural images are not parallelized, the correspondence region 506 may be computed in an interpolation process. It should be noted that if the offset error of the brightness between the image example 204 and the image example 206 is so large that it cannot be ignored in computation, the offset value may be computed and subtracted in an additional process in the range of the large region 306 containing the target object 208 on the assumption that the pixel corresponds with the position shifted by the representative value 502. Further, in the case where the error variation in the brightness value of each pixel is so large that it cannot be ignored in computation, the error variation assumed on the basis of the matching degree of brightness may be subtracted in an additional process.

Figure 6:
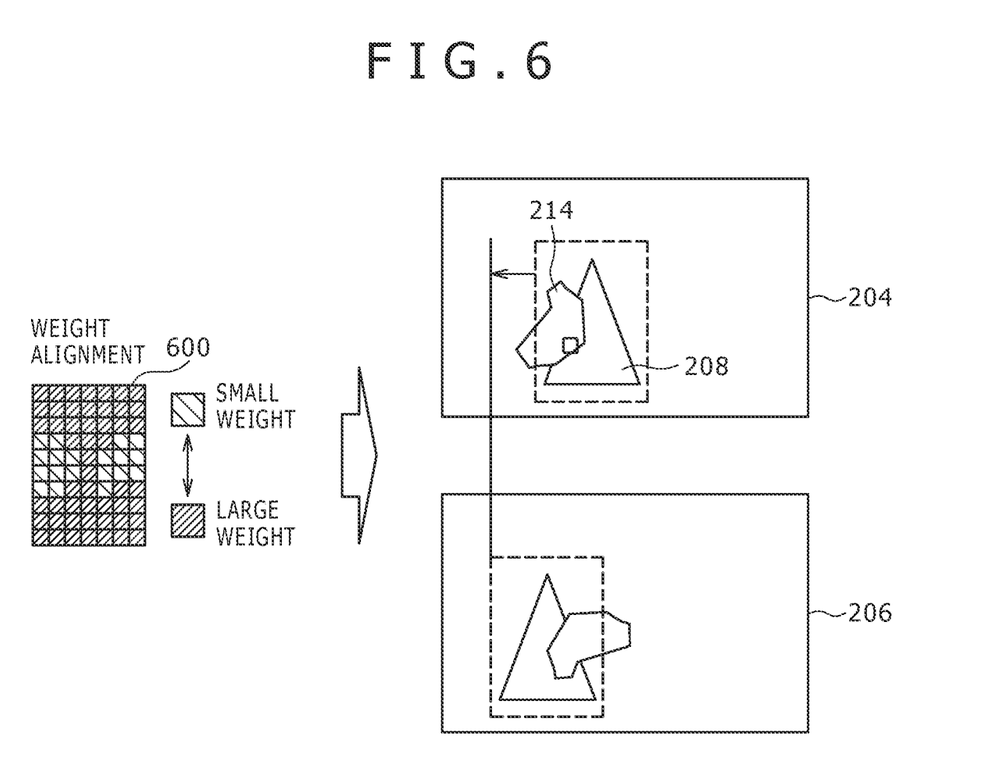
FIG. 6 is a diagram for showing a processing conceptual example in large region processing means of the present invention.

FIG. 6 is a processing conceptual diagram of the large region processing means 118 configuring the stereo camera processing device 100, and the diagram will be described below using reference numerals.

The large region processing means 118 that is a second region processing unit determines a weight value on the basis of the error factor identified by the error factor identification means 116, and measures a distance for each large region that is the second region using the weight value to generate a second distance image. In this case, if the result of determination by the error factor identification means 116 shows that the peak value of the frequency histogram 500 is a predetermined threshold value or larger, or the ratio or difference between the peak value and the second or following peak value is the threshold value or larger, the weight value is set smaller as compared to the pixel smaller than the threshold value, or the pixel having the threshold value or larger is deleted.

Specifically, the large region processing means 118 makes the large region 306 of the left image example 204 correspond with the right image example 206 as one block, and computes the disparity, so that the distance up to the target object 208 is derived. The small region processing means 112 derives the distance while making correspondence with each small region. On the contrary, the distance can be stably and accurately derived because the amount of information is increased by making the large region 306 correspond as one block. The large region 306 contains pixels of error factors that deteriorate the accuracy of distance measurement, and information of the error factors based on the difference of the brightness value of each pixel between the right and left images extracted by the error factor identification means 116 is identified. Thus, the distance of the large region 306 is derived using the information.

Specifically, in a computation process in which a disparity that minimizes or maximizes an evaluation value e with a correspondence function f is searched for correspondence for each point p in the range of all pixels $\Sigma$ in the large region 306, the information of error factors is represented as a coefficient of a weight value W when $e=\Sigma(f(p)W(p))$. In the search of the minimum or maximum value, various methods of image processing can be applied. As an example, "Sum of Squared Difference" is applied to the correspondence function f, and the evaluation value e may be computed around the position where the large region 306 is moved by the disparity of the representative value 502 to extract the minimum value. The weight value W is determined on the basis of the difference of the brightness value of each pixel between the left image example 204 and the right image example 206 computed by the error factor identification means 116. In the case where the evaluation value e is minimized, the weight value W is increased when the difference of the brightness value is small. In the case where the evaluation value e is maximized, the weight value W is decreased when the difference of the brightness value is small. For example, the weight value W may be determined so as to be decreased in proportion to the difference between the brightness value of the arbitrary pixel 504 and the range of the brightness values of the correspondence region 506, or usage of each pixel may be determined while setting a threshold value to the difference of the brightness value.

When a distance up to the target object 208 is derived using the left image example 204 and the right image example 206, the influence of the pixels of error factors can be minimized by applying the above-described computation. In addition, the large region 306 corresponds as one block, so that stable and accurate computation with much information can be carried out.

Further, the large region processing means 118 that is the second region processing unit that generates a weight alignment 600 by aligning the weight values W as similar to the pixel alignment of the image to be used for weight adjustment of each pixel in the computation of evaluation values of each recognition/extraction/measurement process in image processing generates the weight alignment 600 in the large region 306 on the basis of the difference of the brightness value that is the error factor determined by the error factor identification means 116, and measures a distance for each large region 306 using the weight alignment 600 to generate the second distance image, so that the performance can be improved because the influence of the error factor can be suppressed.

It should be noted that as shown by the dashed arrow returned from the large region processing means 118 to the error factor identification means 116 in FIG. 1, the disparity (correspondence position or distance) having a small error with the influence of the raindrops and stains 214 removed can be obtained after the operation by the large region processing means 118. Thus, the error factor identification means 116 is operated again using the disparity having a small error, so that information other than the target object 208 for measurement that is a large error factor such as the raindrops and stains 214 and other than the target object 208 for measurement that is a small error factor may be removed or the weight thereof may be reduced to realize the high accuracy. Specifically, the background information existing around the target object 208 for measurement corresponds to this. The information cannot be identified because the error of the representative value 502 is large in the error factor identification means 116 for the first time. However, the information can be identified using the disparity having a small error. Further, the process repeatedly performed by the error factor identification means 116 may be looped plural times to realize the high accuracy.

Figure 7:
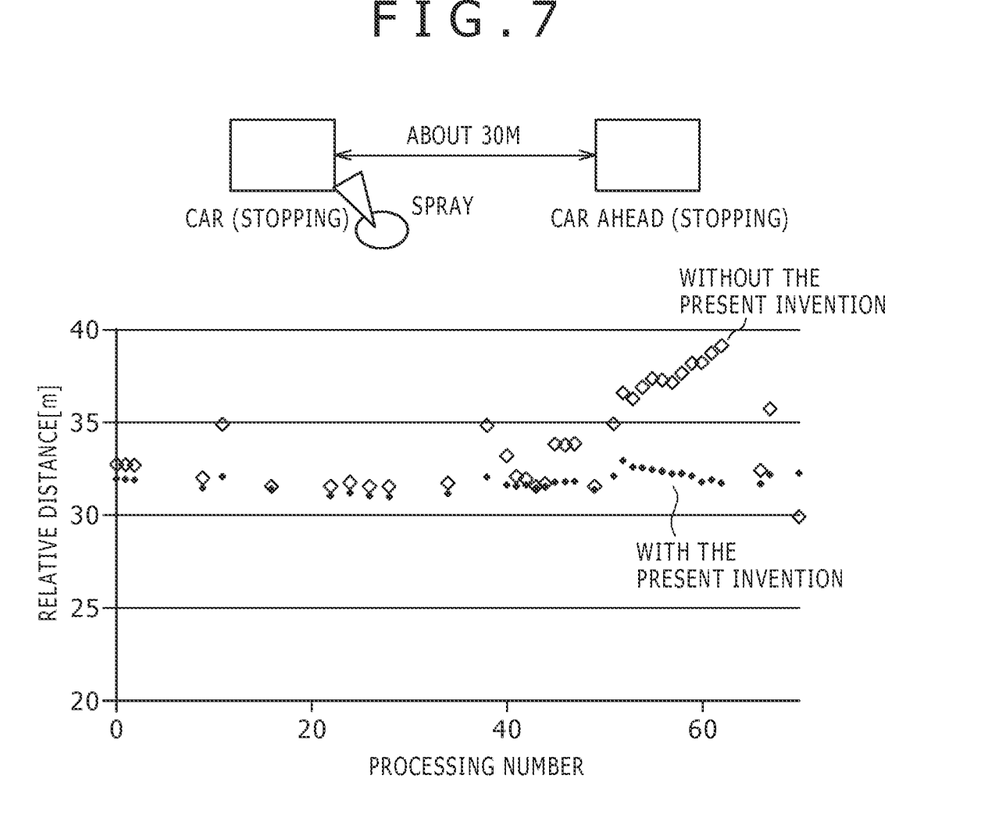
FIG. 7 is a diagram for showing experimental results by the stereo camera of the present invention.

FIG. 7 shows an experimental result for confirming the effect of the present invention, and the result will be described below using reference numerals.

As experimental conditions, using a stereo camera mounted in a car (own car) that was stopping, the distance of another car (car ahead) that was stopping about 30 m ahead was measured as the target object 208 for measurement, and a windshield located in front of the stereo camera was wetted with a spray.

In the graph of FIG. 7, in the case where the present invention was not applied (without the present invention), a maximum error of about ±5 m occurred in the measured distance due to the influence of the water droplets. However, in the case where the present invention was applied (with the present invention), the error of the measured distance was suppressed to a maximum error of about ±1 m. Accordingly, even in the case where an image contains the raindrops and stains 214, a stereo camera with a small error of the measured distance can be realized by applying the present invention.

The embodiment has been described as a monochrome image by using only the brightness value of the image. However, the concept of the present invention can be similarly applied to a color image and an infrared image in the expression of each color. Further, the embodiment has been described using two images of the image example 204 and the image example 206. However, the concept of the present invention can be applied to a case in which a geometric relation between two or more images and the position and posture of a camera that imaged the images can be obtained.

As a representative example to which the embodiment is applied, there is a stereo camera that is mounted in a car to realize a drive assist function. The stereo camera in this case mainly uses cars or pedestrians in the vicinity as the target objects 208 for measurement. However, in order to control the movement of the car and the target object 208 for measurement, a relative velocity is measured in some cases. When the relative velocity is measured, there is a computation method on the basis of the current relative distance and the enlargement/reduction ratios of the current and past view angles, in addition to a computation method in which the difference between the current relative distance and the past relative distance is divided by the measurement interval. Even in the case of computing the enlargement/reduction ratios, the weight alignment 600 created by the large region processing means 118 of the present invention is used as a coefficient for computation of each pixel. Namely, the relative velocity is computed using the weight values or the weight alignment 600 obtained by aligning the weight values, so that the influence of pixels as the error factors may be reduced to realize the high accuracy.

Further, when computing the enlargement/reduction ratios, for example, in the case where the weight alignment is additionally created in accordance with the size of the brightness gradient for correcting a contribution ratio in the computation of each pixel, the weight alignment 600 created by the large region processing means 118 may be used together.

Second Embodiment

Hereinafter, plural embodiments that are different from the first embodiment and that achieve the object in the same way as or more effectively than the first embodiment of the present invention will be described. The embodiment is different from the first embodiment in the following points, but is basically the same as the first embodiment in the other points. Thus, overlapped explanations will be omitted.

In the first embodiment, the stereo camera that minimizes the errors of the measured distance even in the case where raindrops and stains are contained in an image has been described. However the performance can be improved in recognition (sensing or detection) of the target object for measurement using the similar concept.

Therefore, configured is a process shown by the dashed arrow returned from the large region processing means 118 to the target object extraction means 114 of FIG. 1.

The target object 208 for measurement is extracted as one large region by the target object extraction means 114 for the first time. In this case, it is necessary to determine whether or not the large region corresponds to an object measured by the system. In the first embodiment, the large region is extracted in accordance with a conventional procedure in which the influence of the raindrops and stains 214 is not eliminated. Thus, the target object extraction means 114 fails to extract the large region due to the influence of the raindrops and stains 214, or erroneous recognition occurs in some cases. On the contrary, the threshold value for the determination is eased in the target object extraction means 114 for the first time, and the operation is performed to the step of the large region processing means 118.

Further, the target object extraction means 114 can determine whether or not the large region corresponds to an object to be measured by the system for the second time after pixels other than the target object 208 for measurement are removed by using the weight alignment 600 obtained by the large region processing means 118 as the contribution ratio in the computation of each pixel. The error factors are removed by the target object extraction means 114 for the second time. Thus, even if the threshold value for the determination is strictly set, the determination can be made without a mistake. Therefore, the performance of extracting the target object for measurement can be improved.

LIST OF REFERENCE SIGNS 100 stereo camera processing device
110 image acquisition means
112 small region processing means
114 target object extraction means
116 error factor identification means
118 large region processing means
150 camera
160 control device
200, 202, 204, 206 image example
208 target object
210 image region
212 correspondence position
214 raindrops and stains
300 small region
302 small region
304 distance image
306 large region
500 frequency histogram
502 representative value
504 arbitrary pixel
506 correspondence region
600 weight alignment

The invention claimed is:

1. A stereo camera comprising:
an image acquisition unit that acquires plural images imaged by plural imaging units;
a first region processing unit that parallelizes the images acquired by the image acquisition unit, divides each of the plural images acquired by the image acquisition unit into first regions composed of predetermined plural pixels, wherein a size of the first regions is determined based on an angle of view of the stereo camera and a number of the predetermined plural pixels, and measures a distance for each of the divided first regions to generate a first distance image;
a target object extraction unit that extracts a target object from the first distance image or one of the plural images, and extracts a second region composed of the plural first regions including the extracted target object;
an error factor identification unit that extracts a predetermined representative value from inside of the extracted second region, compares a brightness value of an arbitrary pixel in the second region with a brightness value in a correspondence region up to a position moved from the arbitrary pixel by a disparity represented by the representative value in another image, and determines an error factor based on a comparison result; and
a second region processing unit that determines a weight value based on a difference of the brightness value of the arbitrary pixel in the second region and the brightness value of the correspondence region as the error factor, and measures a distance for the second region using the weight value to generate a second distance image, wherein the weight value is determined so as to be decreased in proportion to the difference between the brightness value of the arbitrary pixel and a range of brightness values of the correspondence region;

wherein, after pixels other than the target object are removed, the target object extraction unit removes the error factor and determines whether the second region corresponds to an object to be measured by the stereo camera;
wherein the second region processing unit creates a weight alignment in accordance with a brightness gradient for correcting a contribution ratio in an enlargement/reduction ratio for each pixel;
wherein the error factor identification unit generates a frequency histogram using the first distance image, and extracts a largest peak value of the frequency histogram in the extracted second region as the representative value;
wherein the error factor identification unit determines, after extracting the representative value, whether a ratio or a difference between the largest peak value and a second largest peak value is equal to or larger than a threshold value, and when the ratio or difference between the largest peak value and the second largest peak value is equal to or larger than the threshold value, the second region processing unit sets the weight value smaller as compared to the pixel smaller than the threshold value, or deletes the pixel which is equal to or larger than the threshold value.

2. The stereo camera according to claim 1, wherein the second region processing unit generates a weight alignment in the second region on the basis of a difference of the brightness value that is an error factor determined by the error factor identification unit, and measures a distance for the second region using the weight alignment to generate the second distance image.

3. The stereo camera according to claim 1, wherein a relative velocity is computed using the weight value.

4. The stereo camera according to claim 1, wherein the size of the first regions varies depending on an amount of noise.

5. The stereo camera according to claim 1, wherein the target object is extracted by grouping the first distance image.

6. The stereo camera according to claim 1, wherein the target object is extracted by grouping based on similarity of colors of images between adjacent pixels.

7. The stereo camera according to claim 1, wherein, when generating the frequency histogram, a Gaussian filter is overlapped, so that the representative value can be stably obtained.

8. The stereo camera according to claim 1, wherein an unmatched pixel results in an error when the correspondence region is computed among plural images in the second region containing the target object, and are removable in accordance with a degree of matching.

9. The stereo camera according to claim 1, wherein, when error variation in the brightness value of each pixel is so large that it cannot be ignored in computation, the error variation assumed based on a matching degree of brightness is subtracted.

10. The stereo camera according to claim 1, wherein the error factor identification unit is operated again using the disparity having a small error, so that background information existing around the target object that has a large error factor is removed or a weight thereof is reduced to realize high accuracy.

* * * * *